Figure 5:
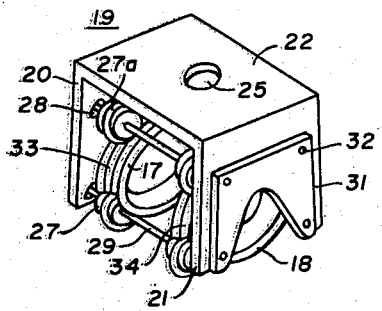

April 14, 1959 C. E. KRAUS 2,881,622
POWER TRANSMISSION DEVICE
Filed Aug. 18, 1953 4 Sheets-Sheet 1
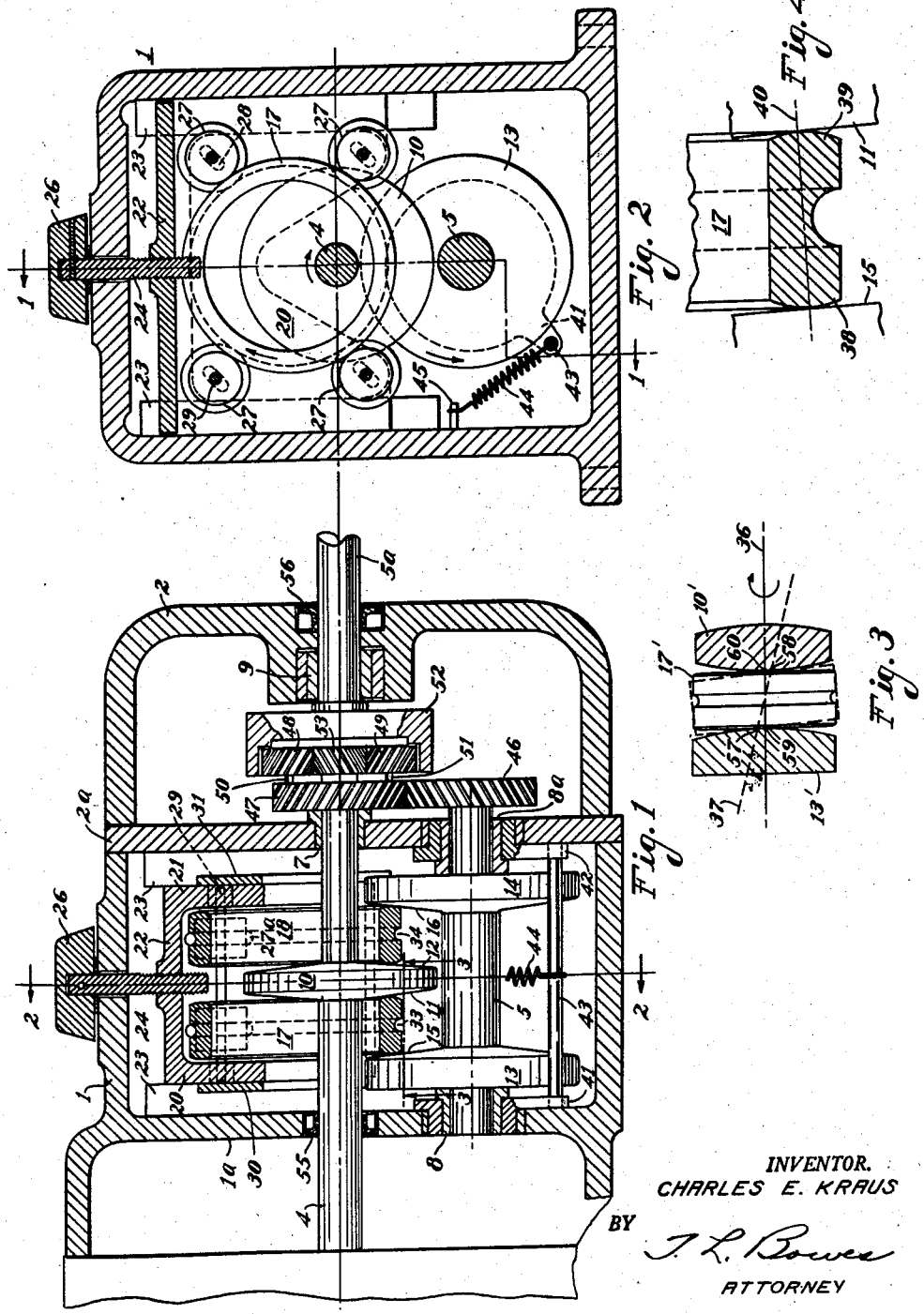
INVENTOR.
CHARLES E. KRAUS
BY
*J. L. Bowes*
ATTORNEY April 14, 1959
C. E. KRAUS
2,881,622
POWER TRANSMISSION DEVICE
Filed Aug. 18, 1953
4 Sheets-Sheet 3
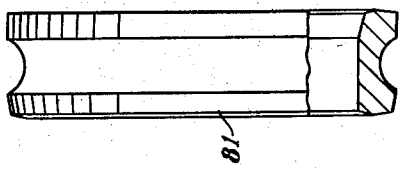
Fig. 12
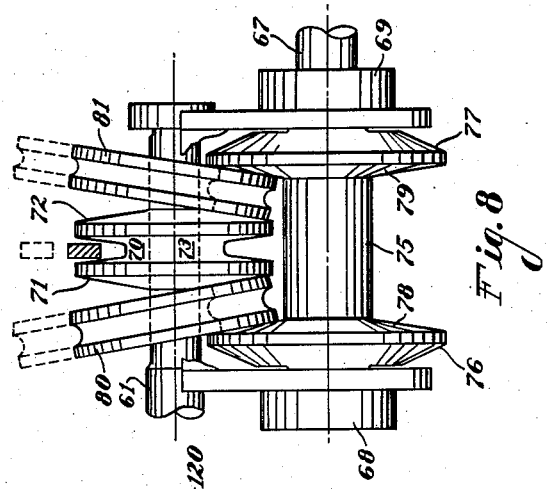
Fig. 8
Fig. 11
INVENTOR.
CHARLES E. KRAUS
BY
*J. L. Bowes*
ATTORNEY April 14, 1959  C. E. KRAUS  2,881,622
POWER TRANSMISSION DEVICE
Filed Aug. 18, 1953  4 Sheets-Sheet 4
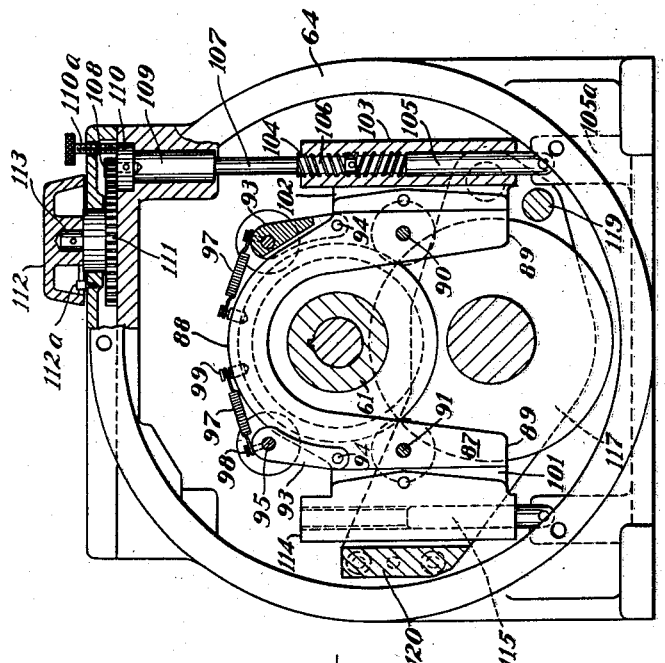
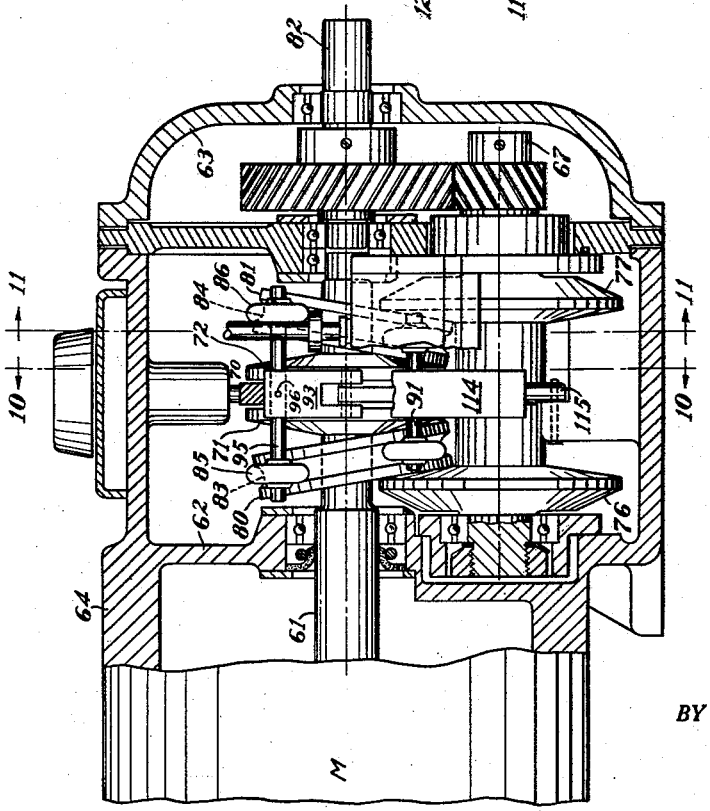
INVENTOR.
CHARLES E. KRAUS
BY
J. L. Bowes
ATTORNEY United States Patent Office 2,881,622
Patented Apr. 14, 1959

2,881,622
POWER TRANSMISSION DEVICE

Charles E. Kraus, Rochester, N.Y., assignor to Excelermatic, Inc., a corporation of New York Application August 18, 1953, Serial No. 374,863

14 Claims. (Cl. 74—193)

This invention relates to power transmission devices and more particularly to variable speed means of the all-metal friction type wherein the output speed is progressively variable relative to the input or driving speed throughout a wide range of speeds.

This is a continuation-in-part of my copending application Serial No. 311,296, filed September 24, 1952, now abandoned, and assigned to the same assignee as the present application.

Variable speed power transmission devices have been developed heretofore. Many of such prior art devices known to applicant except the ball type described and claimed in my copending application Serial No. 206,334, filed January 17, 1951, now Patent No. 2,701,970, have been so arranged that the forces developed are transmitted to or carried by radial and/or thrust bearings, thereby necessitating relatively heavy duty, expensive bearings and increasing friction losses which results in relatively low efficiency.

For example, in one device in public use, there is provided a pair of spaced-apart shafts, each of which carries a pair of axially disposed bevel discs or cones movable axially with respect to each other and mounted for rotation with the associated shaft. A rigid friction ring engages the bevelled portion of both pairs of discs for transmitting motion from one pair to the other. Bearings are provided for transmitting radial and thrust pressure from the discs or cones to the casing. In the commercially available models, two bearings are used for each disc or cone and additional bearings for the shafts.

A serious fault found in many prior art devices is the inability of such devices to build up contact forces as fast as may be needed under sudden overload conditions. The resulting slip or scuffing action relatively rapidly destroys the contact surfaces. The common use of hydraulic means to obtain contact force introduces an unavoidable build up time and as often as not also limits the maximum contact force because of fluid pressure limitations. Spring means as the source of contact force has also proven impractical because of the existence of a force limit and because such force is usually operative at all times whether or not needed for carrying the load.

A further fault commonly found in such prior devices is a lack of provision for insuring that mating contact surfaces travel in exactly the same direction at the point of contact. This condition is desirable under all load and speed conditions as well as when adjustment of speed ratios is made.

Accordingly, it is an object of my invention to provide a new and improved power transmission device of a type in which all contact forces are contained within the working parts and are not transmitted to or carried by any bearing to any substantial degree whereby simple and inexpensive bearings may be employed.

Another object of my invention is to provide a variable speed power transmission device having a new and improved form of selective adjustment of the speed ratio of input and output shafts under load conditions.

Still another object of my invention is to provide a new and improved power transmission device of variable speed, simple design, and relatively low cost, which comprises a minimum number of parts whereby construction and assembly is facilitated and the various parts are easily accessible for repair and replacement, and which has a wide range of speed ratios.

Figure 6:
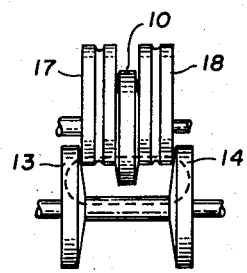
Figure 7:
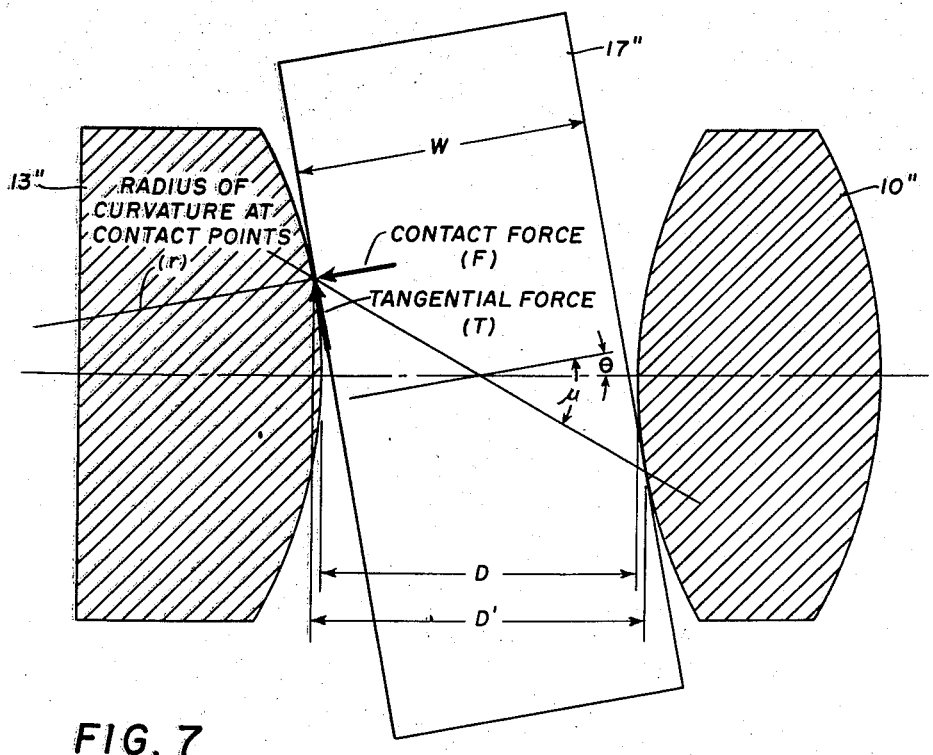

My invention, together with other objects and advantages will be best understood from the accompanying description taken in connection with the accompanying drawings in which Fig. 1 is a side view of one embodiment of my invention, partly in section along the line 1—1 of Fig. 2, Fig. 2 is a sectional view taken along the line 2—2 of Fig. 1, Figs. 3, 4, and 5 are views illustrating details of the embodiment of Figs. 1 and 2, Fig. 6 is a simplified view of parts of Fig. 1, Fig. 7 is a diagrammatic view which is helpful in understanding the principles of my invention, Figs. 8 to 11, inclusive, illustrate a second embodiment of my invention, and Fig. 12 is a partial view of a motion-transmitting ring such as employed in Figs. 8 to 11, inclusive.

The embodiment of my invention illustrated in Figs. 1 and 2 and described herein is contained within a suitable housing comprising a suitable casing member 1 and end member 2, these members being secured together in any suitable manner on either side of a partition 2a. Shafts 4 and 5 are suitably journalled, as shown, in casing 1 and partition 2a and shaft 5a is suitably journalled in end piece or member 2.

Since the speed changer disclosed herein is a bi-directional drive, either of the shafts 4 and 5a may be driven or employed to drive. For the purposes of this specification, it is assumed that shaft 4 is the driving or input shaft and shaft 5a is the driven or output shaft.

Thus driving shaft 4 is suitably journalled at one end in partition 2a by suitable means such as bushing 7 and at the other end in any suitable manner (not shown); intermediate shaft 5 is suitably journalled in housing 1 and partition 2a as by means of bearing or bushing assemblies 8 and 8a, respectively; and output or driven shaft 5a is suitably journalled in end member 2 as by means of roller bearing assembly 9. Suitable lubricant seals 55 and 56 are preferably provided in partition 1a and end member 2, respectively.

As best seen in Fig. 1, shafts 4 and 5 are parallel and spaced apart. On shaft 4, there is provided a disc-like driving member or annular flange 10 normal to shaft 4 and intermediate cover wall 1a and partition 2a. Member 10 may be integral with shaft 4, as shown, or separable and fastened thereto in any suitable manner.

Driving member 10 is provided with faces or surfaces 11 and 12 which preferably taper slightly from shaft 4 toward the outer or circumferential edge, as about 6° for example, thereby providing slightly conical surfaces.

Shaft 5 is provided with a pair of spaced-apart annular disc-like driven members 13 and 14 disposed normally to shaft 5 on opposite sides of and spaced axially from driving member 10. Opposing surfaces or faces 15 and 16 of members 13 and 14, respectively, taper toward the outer edge at the same angle as surfaces 11 and 12 so that the adjacent surfaces 15, 11 and 16, 12 are parallel.

In order to transmit motion from driving shaft 4 to shaft 5, there is provided means frictionally disposed between surfaces 11, 15 and 12, 16, respectively. In the form of my invention shown in Figs. 1 and 2, the motion transmitting means comprises a pair of annular power transmitting rings 17 and 18. Means is provided to maintain rings 17 and 18 in position. This means, illustrated in detail in Fig. 5, includes a support or cage assembly comprising a support 19 of U-shaped cross section having arm or skirt portions 20 and 21 and base portion 22. The bottom edges of skirt portions 20 and 21 are cut away or recessed intermediate the ends to provide clearance for shaft 4. Support 19 is vertically movable between guides 23 as by means of screw 24 having a threaded portion engaging a suitably threaded bore 25 in base portion 22 of support 19, and a knob 26.

Support 19 is arranged to carry two sets of four rollers 27, having circumferential ribs 27a arranged for supporting engagement with circumferential grooves 33 and 34 of rings 17 and 18, respectively. Skirt portions 20 and 21 are provided with four similarly inclined or diagonally positioned slots 28 near the corners of the skirt portions. A rod 29 extends through each opposed set of slots. The rods 29 are secured together externally of the cage side members 20 and 21 as by side plates 30 and 31 which are substantially the same shape as portions 20 and 21 but are narrower than portions 20 and 21. Each plate has openings 32 corresponding in position to slots 28 for receiving pins 29, which are preferably secured tightly, as by welding or copper brazing, for example, in openings 32.

Two rollers 27 are loosely carried on each shaft or rod 29, the rollers thus being mounted between skirt portions 20 and 21. Rollers 27 are spaced with respect to the associated rings for adequate support. While I have shown four rollers for each ring, any desired number may be employed, although if suitable support is to be provided at least three rollers are desirable.

If it is assumed that driving shaft 4 is rotated in the clockwise direction as shown in Fig. 2, the friction between surface 11 and ring 17 tends to cause ring 17 to rotate in the same direction. The friction between the opposite edge of ring 17 and surface 15 tends to cause member 13 to rotate in the counter direction, as viewed in Fig. 2. Similarly member 10 tends to drive member 14 through ring 18.

Fig. 3, which is an adaptation of the section 3—3 of Fig. 1, is useful in further understanding my invention, the section 3—3 being distorted for the purpose of illustrating a principle of operation of my device. If numerals 10', 13' and 17' represent schematically driving member 10, driven member 13, and ring 17, respectively, rotation of member 10' in the clockwise direction tends to rotate ring 17' clockwise in a plane perpendicular to the paper. Accordingly, member 13' is caused to tend to rotate in the clockwise direction. However, the friction between member 10' and ring 17' also tends to twist or displace ring 17' about the line 36 in a counterclockwise direction, as for example, to the position indicated by the dashed rectangle. It will thus be seen that the actual line of engagement between members 10' and 13' and ring 17' falls along the dash line 37. Because of this twisting effect, the distance between contact points 57 and 58 is greater than the distance between contact points 59 and 60 (which is the condition of rest). Thus, the loading on driven member 13' has tilted ring 17' into wedging position in accordance with the existing loading condition. A greater load or torque requirement causes still greater wedging by further tilting ring 17', which results in greater wedging action. Similarly, a lighter load causes less tilting and a lesser degree of wedging. From the foregoing explanation, it is apparent that the wedging action is proportional to the applied force and it will be understood that substantially all contact forces act through the discs or driving members, rings 17 and 18 and shaft 5 and substantially no forces are applied to the shaft bearings or the housing of the device. This effect is shown by means of the dotted line of Fig. 6.

The relative rigidity of the driving discs and shafts and the width of the drive rings have an important bearing on the proper functioning of the transmission device. If these parts are too flexible or the rings are too narrow, undue slipping results whereas too great a degree of stiffness or rigidity or excessive ring width cause abnormal forces, and undesirable or unnecessary stresses. Moreover, the resulting binding requires unnecessary driving power. Therefore, the driving parts should be sufficiently rigid to prevent slippage but not so rigid as to establish excessive power requirements and such rigidity must be correlated with ring width. From a different point of view, the designer should seek to provide the minimum contact force without slipping. Satisfying this condition depends upon the existence of a narrow working range of the coefficient of friction. Too high a design coefficient permits slipping while too low a design coefficient results in unnecessary contact force.

Means is provided for minimizing any tendency of rings 17 and 18 to depart from a plane normal to the axes of shafts 4 and 5. Referring to Fig. 4, rings 17 and 18 have generally rectangular cross-sections except that edges 38 and 39 of ring 17 are formed, as by grinding, to provide convex surfaces. The radius of curvature is preferably substantially greater than half the width of the ring. Moreover, the center of curvature is chosen to lie along the line 40 normal to the surfaces 15 and 11 with respect to ring 17 (ring 18 being arranged similarly), so that the centers of curvature of the edges of the rings are offset from the axial center line of the rings by different amounts. Because of the long radii, any tendency to depart from perpendicularity causes a wedging action. There results a tendency of the rings to remain centered. If desired, in place of such curved surfaces, narrow flats may be provided at the same contact points. It should also be noted that the width of rings 17 and 18 taken in the axial direction is substantially greater than the thickness of the rings in the radial direction, i. e., referring to the cross-section of the rings, the rings are substantially wider than they are thick. In the embodiment shown in Figs. 1 to 7, inclusive, the ratio is approximately 2 to 1.

The speed ratio between shafts 4 and 5 depends upon the relative positions of rings 17 and 18 with respect to members 10, 13, and 14. Referring to Fig. 1, if rings 17 and 18 are caused to move upwardly, the points of engagement with the driving member 10 move closer to the center of the member 10, i.e., toward shaft 4, and move nearer the periphery of members 13 and 14, i.e., away from shaft 5, thereby effecting a speed reduction, it being assumed that shaft 4 is the driving shaft. On the other hand, if rings 17 and 18 are moved downwards (in Fig. 1), the contact points on faces 11 and 12 are nearer the periphery of member 10 and the contact points on faces 15 and 16 shift closer to shaft 5, resulting in a speed up of shaft 5. Other ratios will readily occur to those skilled in the art as rings 17 and 18 are positioned at various points between the extreme positions.

As previously noted, ratio adjusting means, controlled from knob 26, is provided. Raising support 19, for example, causes support 19 to move upwardly. The ring-roller assembly tends to follow, but the frictional engagement between rings 17 and 18 and driving members 10, 13, and 14 resists upward movement of the roller assembly and rings 17 and 18. Hence, initially engagement between the edges of inclined slots 28 and pins or shafts 29 tends to cause pins 29, and hence side plates 30 and 31, to move toward the left. The resulting swiveling of the contacts of rings 17 and 18 changes the angle of approach of the rotary discs 10, 13 and 14 relative to the rings and causes the rings to move or progress in the direction in which support 19 was moved thereby causing rods 29 to again move into a central position in slots 28. Hence, shafts 29 tend automatically to center themselves in inclined slots 28. Thus, the provision of slots 28 permits lateral movement of the roller-ring assembly during adjustment of the output speed without undue friction and binding.

Instead of using inclined slots it is obvious that the rods 29 and plates 30 and 31, as an assembly, could be pivotally attached off center to support 19 wth equivalent swiveling action and resulting in a similar progression under motion.

Means is provided to minimize play in one or both shafts 4 and 5 and to urge members 13 and 14 into engagement with rings 17 and 18. For example, bearing assemblies 8 and 8a may be provided with offset portions 41 and 42 arranged to receive a rod 43. A suitable spring 44 may be provided between rod 43 and the wall of casing 1, as by means of a suitable annularly grooved pin 45. By making bearing assemblies 8 and 8a slightly eccentric, spring 44 tends to urge shaft 5 towards shaft 4 to insure an initial operating contact.

In order to transmit rotation of shaft 5 to driven or output shaft 5a, suitable gear means is provided in the form of my invention shown in Figs. 1 and 2. Spur gear 46 is suitably secured to an extension of shaft 5 for engagement with a suitable spur gear 47 suitably journalled on shaft 4. Gear 47 carries a pair of planetary gears 48 and 49 as by means of pivot members or axles 50 and 51, respectively. The peripheral teeth of gears 48 and 49 engage the teeth of internal ring gear 52 suitably secured to shaft 5a. The sun gear 53 is suitably secured to shaft 4.

Rotation of gear 46 causes rotation of gear 47 without regard to motion of shaft 4. Rotation of gear 47 is transmitted to gear 52 and shaft 5a through gears 48 and 49.

With the planetary gearing as shown it is obvious to those familiar with the gearing art that output speeds from zero or even from a reversed direction up to relatively high forward speeds are obtainable. However, it is not necessary to use such planetary gearing if low output speeds to or near zero are not required inasmuch as simple gearing from shaft 5 to 5a will give an output ratio range of about 8 or 10 to 1 directly by adjustment of the ring positions.

An essential to the practical performance of an all-metal friction-type speed changer is the development of contact forces as a function of the tangential forces operating on the contact points. Experience has also proven that these contact forces must be built up almost instantaneously with increase in loads in order to prevent momentary slipping or skidding and consequent scuffing of contact surfaces. Attempts to develop this contact force by hydraulic or complicated mechanical means have resulted in impractical operation due to an inherent delaying action of such designs. Also, these means usually limit maximum forces which can be developed because of limited fluid pressure available so that overloads, requiring greater forces, result in destructive scuffing. It should also be noted that high inertia in the parts involved tends to prevent the instantaneous build-up of forces required, unless the actuating forces or moments are large relative to such inertia.

This invention uses no auxiliary hydraulic or other means to insure such contact force build up as a function of applied load, and the rings involved have a low inertia. The design is such that, by controlling the rigidity and physical proportions of the elements, the relative values of tangential and contact forces can be predetermined and selected for completely safe operation under any conditions and yet, by avoiding unnecessary forces, make the greatest practical use of the material's capacity.

Fig. 7 shows diagrammatically a ring 17″ corresponding to rings 17 and 18 of Fig. 1 and discs 10″ and 13″ corresponding to discs 10 and 13 respectively and illustrates how the rings 17 and 18 are tilted out of the planes perpendicular to axes 4 and 5 by the imposed tangential forces at the points of contact with the conical discs 10 and 13.

Certain mathematical relationships can be read from this diagram:

$$\frac{T}{F} = \tan \mu = \text{coefficient of friction}$$

where T is the tangential force, F is the contact force, and $\mu$ is the angle between a line drawn through the contact points and a line normal to the faces of the ring.

The coefficient selected for design purposes is determined by test and experience with this and similar designs, and is usually taken as about .045 to .05 for hard steel on hard steel.

The lateral distance between contact points, shown as D′, can be computed from the ring width W and angles $\mu$ and $\theta$ where $\theta$ is the angle of "tilt" or departure from the no-load position of the rings since $$\frac{D'}{W/\cos \mu} = \cos (\mu - \theta) \tag{1}$$

and $$D' = W \frac{\cos (\mu - \theta)}{\cos \mu} \tag{2}$$

The distance D, which is the distance on the no-load centerline between the contact points of the two conical discs and the rings, is a somewhat involved function of the radius of contact curvature at such points, as is also the actual value of the angle $\theta$. Without going into this more involved mathematics it can be shown that D is a function of D′.

Before the application of any forces T or F, D is equal to D′ and to W. The increase from D to D′, therefore, is possible only if a deflection occurs in the discs or in their mounting shafts.

Since deflection is proportional to force, this deflection can be written as $\Delta = kF$ where $k$ represents the rigidity constant of the disc and shaft elements.

However $$\Delta = D - W \tag{3}$$

Since $$D \alpha D' = \frac{W \cos (\mu - \theta)}{\cos \mu} \tag{4}$$

$$\Delta \alpha \frac{W \cos (\mu - \theta)}{\cos \mu} - W \tag{5}$$

$$\Delta \alpha W \left[ \frac{\cos (\mu - \theta)}{\cos \mu} - 1 \right] \tag{6}$$

$$F \alpha \frac{W}{k} \left[ \frac{\cos (\mu - \theta)}{\cos \mu} - 1 \right] \tag{7}$$

Since $\mu$ is a design constant and $\theta$ is fixed by the geometry of the set-up, it follows that $$F = k'W \tag{8}$$

Thus the contact force F is a direct function of the ring width (Equation 8) and an inverse function of the rigidity of the elements (Equation 7) and both W and $k$ can be selected to produce such values of F as are required to give the coefficient of friction already selected.

A different embodiment of my invention is shown in Figs. 8 to 11, inclusive, Fig 8 being a simplified illustration of the detailed speed changer detailed in Figs. 9 to 11, inclusive.

Referring to Fig. 8, there is shown a driving or input shaft 61 suitably journalled in opposite end walls (not shown) of a casing. A suitable driven or output shaft 67 is journalled in suitable bearings 68 and 69 in the end walls. Shafts 61 and 67 are spaced-apart and substantially parallel.

Shaft 61 is provided with a split or divided driving member 70 comprising spaced apart annular portions or discs 71 and 72 having a common hub portion 73 suitably secured to shaft 61 as by means of keys, for example. While an integral driving member is shown in the drawings, two separate discs or elements may be employed. As indicated the outer surfaces of discs 71 and 72 are somewhat conical, the surfaces being flat in cross-section and inclined relative to the shaft. I have found that an inclination angle of 8° is satisfactory in one version which I have built and tested. The adjacent surfaces of discs 71 and 72 are slightly tapered as indicated for a purpose to be described later.

The hub portion 75 of shaft 67 is provided with a pair of spaced apart annular tapered disc-like driven members 76 and 77 disposed normally to hub 75 on opposite sides of and spaced axially from driving element 70. Opposite surfaces or faces 78 and 79 of members 76 and 77, respectively, taper toward the outer edge at the same angle as the outer surfaces of discs 71 and 72 so that adjacent surfaces are parallel.

In order to transmit motion from driving shaft 61 to driven shaft 67, there is provided motion transmitting means comprising a pair of annular power transmitting rings 80 and 81, interposed between the inner faces 78 and 79 of members 76 and 77 and the outer faces of portions 71 and 72.

Operation of the embodiment of Fig. 8 is like that of the first described embodiment, rotation of shaft 61 being transmitted through discs or portions 71 and 72, rings 80 and 81, and discs 76 and 77, respectively, to shaft 67.

The solid lines of the rings 80 and 81 represent one extreme position of the rings and the dashed lines illustrate the other extreme position. In this embodiment, the width of the cross-section is again substantially greater than the thickness thereof. However, the outer edges are slightly beveled, as 2° for example. The radial edges are inclined or chamfered as shown to permit the maximum movement of the rings toward shaft 61 and hub 75, respectively.

As previously stated, each of discs 71, 72, 76, and 77 is tapered toward the circumference thereof. By this means a relatively uniform degree of resiliency in the frictionally engaging parts is obtained. For example, in Fig. 8, when rings 80 and 81 are as represented by the solid lines, the central or hub portion of disc 76 is opposite the thinnest and most flexible portion of disc 71. As ring 80 is moved (by means to be described later) one edge of ring 80 engages a gradually tapering and hence more flexible portion of disc 76, while the opposite edge of ring 80 engages a uniformly thickening part of disc 71. This arrangement minimizes any tendency of these parts to bind.

The detailed version of Figs. 9 to 11, inclusive, is based upon the showing of Fig. 8, except that output shaft 67 is shown as an intermediate shaft suitably geared to a final driven or output shaft 82.

Means is again provided for moving the rings 80 and 81 with respect to the driving element 70 and driven discs or members 76 and 77. In a manner similar to the embodiment of Figs. 1 and 2, the rings 80 and 81 are provided with annular circumferential grooves 83 and 84, respectively, for engagement by a plurality of rollers 85 and 86, respectively, there being shown four rollers for supporting each ring.

In order to support the rollers, there is provided a support, shown as an inverted U-shaped member 87, the upper or base portion 88 being curved to conform to shaft 61 and dimensioned axially to nest between discs 71 and 72, this arrangement serving to minimize the vertical dimension of the assembly. Thus, the "split" driving member 70 not only provides flexibility but has the additional advantage just described.

The two lower rollers of each set are pivotally carried on opposite sides of depending legs 89 of U-shaped member 87 by pins 90 and 91, respectively. Engagement between the rollers and circumferential grooves 83 and 84 is sufficient to retain the parts in assembled relation on the pins, the pins or rods 90 and 91 being keyed to arms 89.

Means is provided for resiliently mounting the upper pairs of rollers against rings 80 and 81. For this purpose, there is provided a pair of U-shaped members 93 having spaced apart depending leg portions extending on either side of portion 89 of member 87. Members 93 are pivotally carried on pins 94 which are retained or keyed in leg portions 89. Pins or rods 95 pass through the opposite ends of members 93 and are retained therein as by suitable pins 96. The upper rollers are carried by rods 95 on either side of support 87. In order to bias brackets 93 in a direction to urge rollers 85 and 86 toward rings 80 and 81 there are provided tension springs 97 extending between pins 98 suitably attached to brackets 93 and pins 99 suitably attached to member 87.

Means is provided for vertically moving the cage assembly comprising rings 80 and 81, rollers 85 and 86 and mounting means in order to adjust the speed ratio between input and output shafts. For this purpose, each leg portion 89 of support 87 is provided with a vertical offset portion or flange 101 having a pivotal connection between flanges 102 on tubular member 103 which has a bore 104 extending longitudinally therethrough. The lower end of bore 104 receives pin 105 pivotally carried from boss 105a on the inside of casing. The upper end of bore 104 is threaded to receive the worm gear 106 carried by rod 107 which extends vertically through casing 64, a gear being secured to the upper end of enlarged portions 109 and 110 of rod 107. In order to turn gear 108 and hence cause member 103 to move vertically on pin 105, I provide pinion 111 engaging gear 108 and rotatable through knob 112 carried by shaft 113 to which gear 111 is secured. The opposite member 114 is free to move similarly to member 103 on pivoted pin 115.

Means is provided to lock the adjustment means. In this embodiment, this means may comprise a threaded member 110a having engagement at its lower end on the surface of enlarged portion 110 of rod 107. Movement of knob 112 may be limited if desired by means of a suitable pin 112a arranged to engage a suitable flange or inward projection (not shown) on the inner surface of knob 112.

Means is provided for automatically taking up for wear of shaft 75 or its associated bearings. Referring to Figs. 10 and 11, there are provided a pair of spaced-apart plates 116 and 117. Each plate is pivotally carried on the inside of the housing 64 as by means of stub pivots 118. In order to maintain plates 116 and 117 in spaced-apart relationship, a shouldered rod 119 is provided, the reduced ends thereof entering suitable openings in plates 116 and 117. The plate ends opposite pivots 118 are joined by tie plate 120.

Universal joint means, generally indicated by numeral 121, is suitably connected to tie plate 120. Member 122 of means 121 is bored and threaded to receive threaded rod 123 which extends through the top of casing 64. A torsion spring 124 surrounds rod 123. The lower end of the spring 124 is secured to rod 123 in any suitable manner; the upper end is secured to adjustment member 125 which is preferably threadedly received in a suitable threaded bore in casing 64. Recesses 126 may be provided to receive a tool such as a spanner for example. A suitable locking means 127 may be provided to lock member 125 in position.

While I have shown and described a particular embodiment of my invention, it will be obvious to those skilled in the art that changes and modifications may be made without departing from my invention in its broader aspects. For example, referring to Fig. 1, shaft 5a and the gear assembly between shafts 5 and 5a may be omitted, in which case shaft 5 becomes the driven or output shaft. I, therefore, aim in the appended claims to cover all such changes and modifications as fall within the true spirit and scope of my invention.

What I claim is:

1. In a motion transmitting device, a first shaft, a pair of spaced-apart disc-like drive members mounted on said first shaft, a second shaft parallel to said first shaft, a third disc-like drive member mounted on said second shaft between said pair of drive members in overlapping relationship therewith, an annular ring interposed between each of said pair of members and opposite faces of said third member, a portion of the outer edge of each of said rings engaging corresponding surfaces of said members, each of said rings having an annular groove in the outer circumferential surface thereof, and a plurality of rollers engaging each of said grooves in ring supporting relationship.

2. In a motion transmitting device, a first shaft, a pair of spaced-apart disc-like drive members mounted axially on said first shaft, a second shaft parallel to said first shaft, a third disc-like drive member mounted on said second shaft between said pair of drive members in overlapping relationship therewith, an annular ring interposed between each of said pairs of members and opposite faces of said third member, the outer edges of said rings engaging corresponding faces of said members, each of said rings having an annular groove in the outer circumferential surface thereof, a plurality of rollers engaging each of said grooves in ring supporting relationship, a support for carrying said rollers, and means for moving said support and hence said rings with respect to said shafts for varying the location of the points of contact between said edges of said rings and said faces in order to adjust the speed ratio between said shafts.

3. In a motion transmitting device, a first shaft, a pair of spaced-apart disc-like drive members mounted axially on said first shaft, a second shaft parallel to said first shaft, a third disc-like drive member mounted on said second shaft between said pair of drive members in overlapping relationship therewith, an annular ring interposed between each of said pairs of members and opposite faces of said third member, said rings lying in planes substantially normal to said shafts, and the outer edges of said rings engaging corresponding surfaces of said members, said rings having a cross-sectional configuration in which the width thereof is substantially greater than the thickness thereof.

4. In a motion transmitting device, a first shaft, a pair of spaced-apart disc-like drive members mounted axially on said first shaft, a second shaft parallel to said first shaft, a third disc-like drive member mounted on said second shaft between said pair of drive members in overlapping relationship therewith, an annular ring interposed between each of said pairs of members and opposite faces of said third member, said rings lying in planes substantially normal to said shafts, and the outer edges of said rings engaging corresponding surfaces of said members, the outer edges of said ring being convex in order to minimize the areas of contact between said rings and said members, said rings having a cross-sectional configuration in which the width thereof is substantially greater than the thickness thereof.

5. In a motion transmitting device, a first shaft, a pair of spaced-apart disc-like drive members mounted axially on said first shaft, a second shaft parallel to said first shaft, a third disc-like drive member mounted on said second shaft between said pair of drive members in overlapping relationship therewith, an annular ring interposed between each of said pairs of members and opposite faces of said third member, said rings lying in planes substantially normal to said shafts, and the outer edges of said rings engaging corresponding surfaces of said members, the outer edges of said ring being convex in order to minimize the areas of contact between said rings and said members, the centers of curvature of said edges being offset from the axial center line of said rings by different amounts.

6. In a motion transmitting device, a first shaft, a pair of spaced-apart disc-like drive members mounted axially on said first shaft, a second shaft parallel to said first shaft, a third disc-like drive member mounted on said second shaft between said pair of drive members in overlapping relationship therewith, an annular ring interposed between each of said pair of members and opposite faces of said third member, said rings lying in planes substantially normal to said shafts, and the outer edges of said rings engaging corresponding surfaces of said members, the outer edges of said ring being convex in order to minimize the areas of contact between said rings and said members, the centers of curvature of said edges being offset from the axial center line of said rings by different amounts, said rings having a cross-sectional configuration in which the width thereof is substantially greater than the thickness thereof.

7. In a motion transmitting device, a first shaft, a pair of spaced-apart disc-like drive members mounted on said first shaft, a second shaft parallel to said first shaft, a third disc-like drive member mounted on said second shaft between said pair of drive members in overlapping relationship therewith, an annular ring interposed between each of said pair of members and opposite faces of said third member, a portion of the outer edge of each of said rings engaging corresponding surfaces of said members, each of said rings having an annular groove in the outer circumferential surface thereof, a U-shaped cage having a pair of skirt portions and a base portion, two sets of rollers, a plurality of diagonally disposed corresponding slots in opposite skirt portions, means for rotatably supporting the respective sets of rollers between said skirt portions and in supporting engagement with the respective rings comprising a plurality of rods extending through said slots.

8. In the device of claim 7, means for varying the position of said cage with respect to said members.

9. The device of claim 7 in which said rollers have circumferential ribs for supporting engagement with the corresponding grooves in said rings.

10. In a motion transmitting device, a first shaft carrying a pair of tapered spaced-apart portions, a second shaft carrying a pair of spaced-apart tapered disc-like members positioned on either side of said pair of portions and spaced therefrom, an annular ring interposed between the inner face of each of said members and the outer face of each of said portions, each of said rings having an annular groove in the outer circumferential surface thereof, and a plurality of rollers engaging each of said grooves in ring supporting relationship, and a support for carrying said rollers.

11. The motion transmitting device of claim 10 in which said support extends between said spaced-apart portions.

12. The motion transmitting device of claim 10 in which predetermined ones of said rollers are resiliently mounted with respect to said rings.

13. In a motion transmitting device, a first shaft carrying a pair of tapered spaced-apart portions, a second shaft carrying a pair of spaced-apart tapered disc-like members positioned on either side of said pair of portions and spaced therefrom, an annular ring interposed between the inner face of each of said members and the outer face of each of said portions, a set of rollers engaging each of said rings in supporting relationship, and means for supporting said rollers comprising a generally U-shaped member having leg portions extending around said first shaft and a base portion extending between said spaced-apart portions, pivot means extending through each of said leg portions, a pair of rollers carried by each pivot means, one on either side of the associated leg, another pair of pivot means carried by said U-shaped member and extending to either side thereof, another pair of rollers carried by each of said another pair, and means resiliently biasing said another pair of pivot means toward said rollers.

14. In a motion transmitting device, a first shaft carrying a pair of tapered spaced-apart portions, a second shaft carrying a pair of spaced-apart tapered disc-like members positioned on either side of said pair of portions and spaced therefrom, an annular ring interposed between the inner face of each of said members and the outer face of each of said portions, a plurality of rollers, each of said rings having an annular circumferential groove to receive said rollers, and means for moving said rollers and hence said rings for moving the points of engagement between said rings and said portions and said members in order to adjust the speed ratio between said shafts comprising a pivoted pin, means for supporting said rollers in engagement with said rings, the last-mentioned means having a tubular portion slidably retained on said pin, and means extending externally of said device for moving said tubular portion and said roller assembly on said pivoted pin whereby said rings are moved with respect to said faces.

References Cited in the file of this patent

UNITED STATES PATENTS

| | | |
|---|---|---|
| 2,089,003 | Sack | Aug. 3, 1937 |
| 2,089,295 | Pollard | Aug. 10, 1937 |
| 2,233,967 | Wellton | Mar. 4, 1941 |
| 2,659,245 | McLaren | Nov. 17, 1953 |

FOREIGN PATENTS

| | | |
|---|---|---|
| 1,012,440 | France | Apr. 16, 1952 |
| 702,915 | Germany | Feb. 19, 1941 |
| 800,265 | Germany | Oct. 25, 1950 |
| 431,088 | Italy | Feb. 23, 1948 |
| 122,816 | Sweden | Sept. 21, 1948 |